Figure 1:
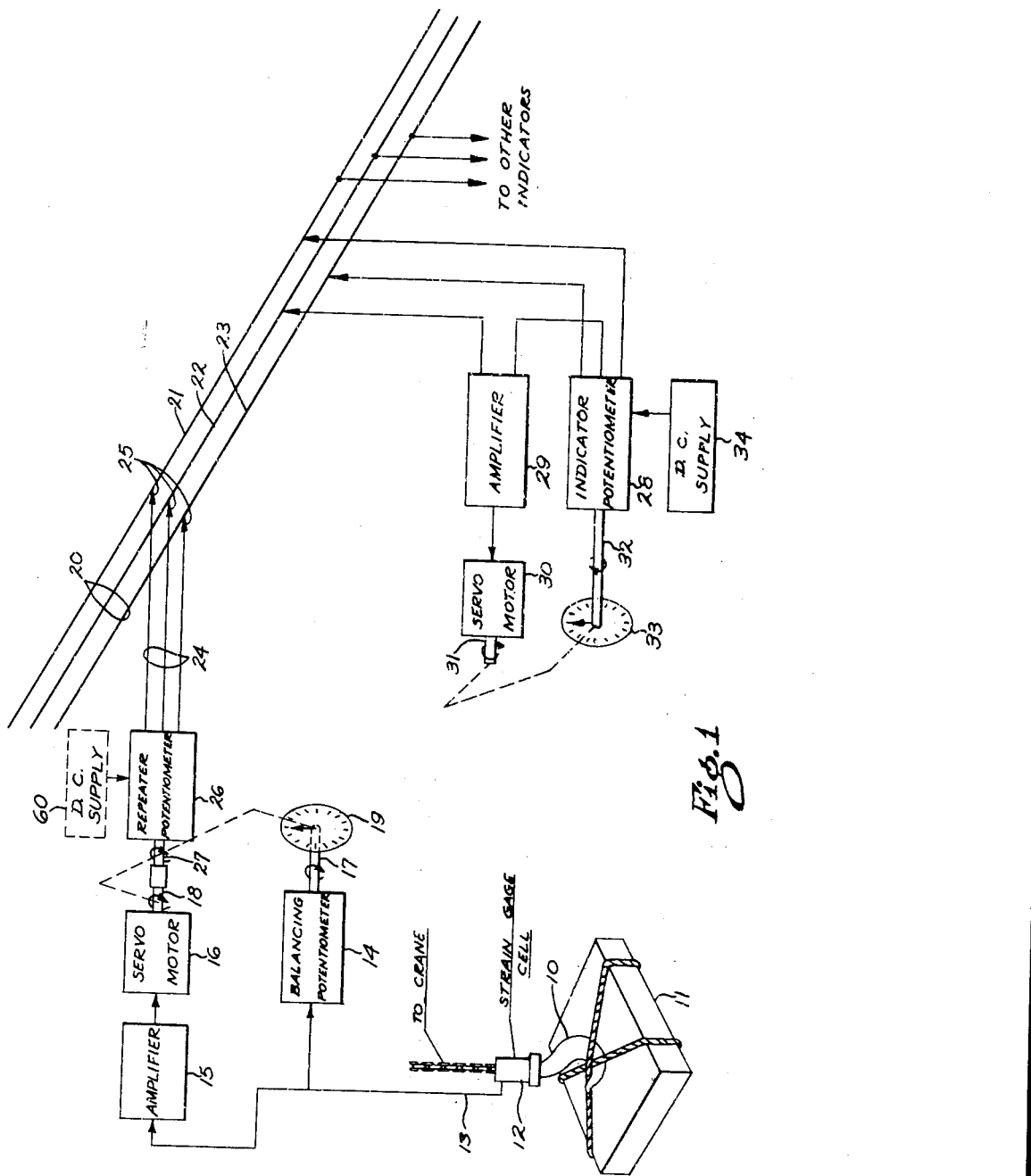

United States Patent Office 2,769,945  
Patented Nov. 6, 1956

2,769,945
ELECTRIC CRANE SCALE REPEATER

Leonard R. Stone, Cleveland, Robert G. Watson, Euclid, and Richard J. Carleton, Jr., Chagrin Falls, Ohio, assignors to Republic Steel Corporation, Cleveland, Ohio, a corporation of New Jersey Application August 12, 1952, Serial No. 304,032

4 Claims. (Cl. 318—29)

This invention relates to weighing apparatus, and more particularly to apparatus for remotely indicating the magnitude of a load carried by a traveling crane.

In the handling of bulk materials in mills, it is customary to use traveling cranes for transferring the material between conveyance and storage piles and vice versa or between conveyances. In order to obtain a measure of the amount of material being transferred, it is presently the practice to weigh the individual loads carried by the crane. A preferred mode of performing such weighing has been by means of a strain gauge system in which the deformation of a standard element which forms a part of the load-supporting element of the crane is measured by suitable electrical apparatus and indicated in terms of weight in the cab of the crane.

Such systems of crane weighing, while displaying very considerable advantages over other known types of systems in terms particularly of accuracy, are limited in that no suitable method has been heretofore found for providing an indication of the weight of the crane loads at points remote from the crane itself. Numerous systems utilizing various types of electrical repeater or data transmission systems have been proposed but have been found unsatisfactory. The prevailing difficulties have been either that the repeater systems were inherently of insufficient accuracy, or, where not so inherently, became so under the adverse conditions encountered. These adverse conditions involve the excessive dirt and vibration normal in a crane and the great variation in contact resistance of the pick-up brushes on the feed rails which serve as a path for the transmission of the signals of the repeater system from the crane to the remote point.

The present invention is concerned with novel weighing apparatus suitable for providing an indication of the weight of the load carried by a crane, at a point remote from the crane. There is included a repeater apparatus on the crane comprising in one embodiment a potentiometer whose shaft is connected to the shaft of the weight indicator for rotation with that indicator. The windings of the potentiometer are connected to a set of pick-up or feed rails associated with the crane through the usual sliding brushes associated therewith. At the remote point, a second similar potentiometer is connected to the pick-up rails and suitable electrical apparatus including a servomotor is provided for driving the second potentiometer shaft to correspond to the position of the shaft of the first potentiometer in response to unbalanced conditions in the circuit formed by the two potentiometers. A dial or other indicating means, connected to the dial of the second potentiometer and calibrated to correspond with the scale on the crane, thus provides a continuous indication of the weight carried by the crane.

It is a feature of the invention that the system permits the use of an unlimited number of remote indicator units with any given crane.

It is a feature of the invention that only two or three feed rails or conductors are required, and that the length of the rails has no effect upon the operation of the apparatus of the invention.

It is a feature of the invention that the accuracy of weight indication is substantially independent of variation in brush contact resistance.

It is a feature of the invention that the accuracy of the system is relatively unaffected by variations in operating conditions, such as would have rendered previously known systems useless.

Figure 2:
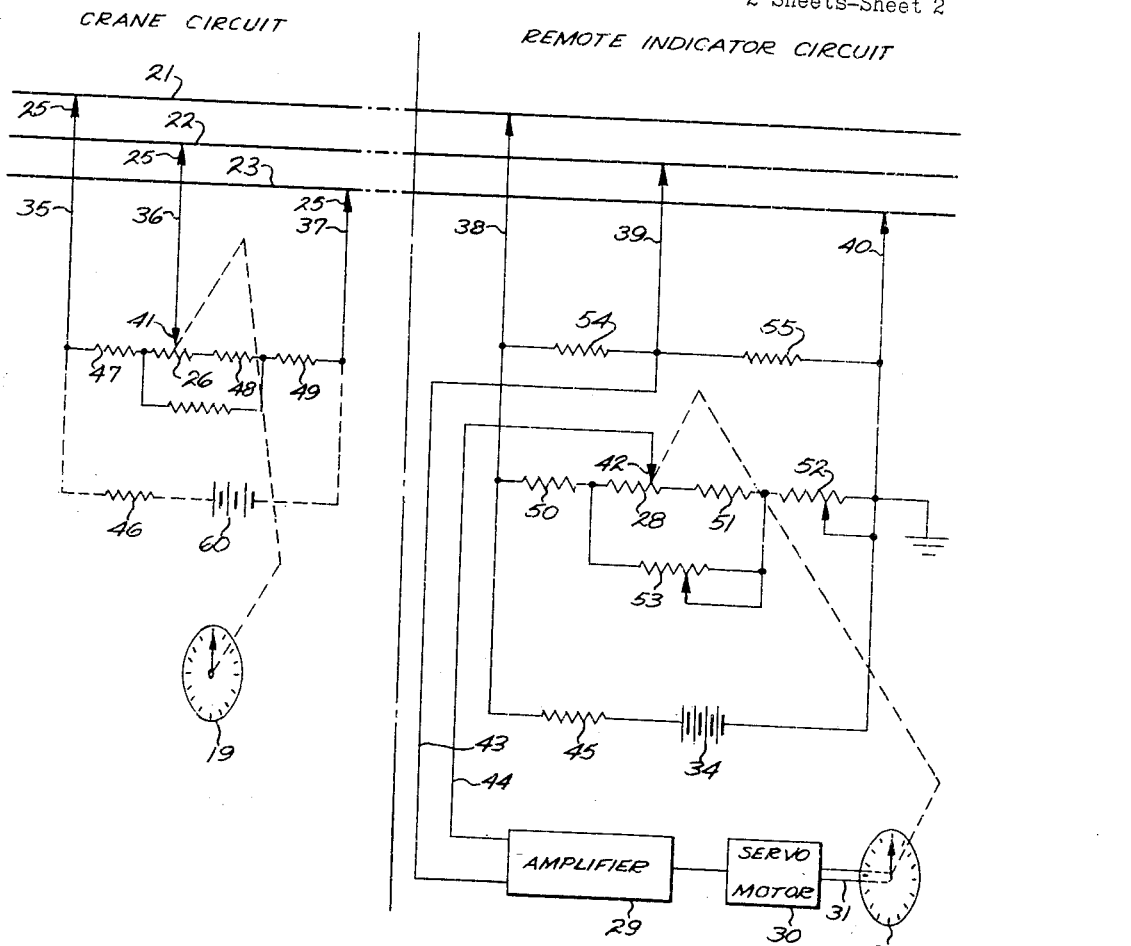

These and other objects, features and advantages of the invention will be more apparent from a consideration of the following detailed specification taken in connection with the accompanying drawings, in which:

Fig. 1 is a schematic representation of the weighing system of the invention; and Fig. 2 is a schematic diagram of the electrical repeater system of the invention.

Referring now to Fig. 1, the weighing apparatus of the invention is intended to be used with a crane, particularly one of the type which moves along rails for the transfer of bulk materials. The crane proper is not shown, but there is shown a hook 10 intended to represent the load-carrying means of the crane and which would normally be utilized to lift some load such as the load 11. Such a crane includes a load-measuring device such as a strain gauge cell 12 connected near the hook 10 or other load-carrying device, the strain gauge cell including means for varying an electric current in response to deformations caused by the weight being lifted. The strain gauge 12 is connected through a conductor 13 to indicating apparatus in the crane proper, including typically a potentiometer 14, an amplifier 15 and an electrical servomotor 16. The potentiometer 14 and the servomotor 16 are mechanically connected through their respective shafts 17 and 18 to a dial indicator 19 which indicates the weight of the load 11.

Associated with the crane is a set of pick-up rails 20 which are disposed along the path of travel of the crane. The pick-up rails 20 are shown as comprising three conductors 21, 22 and 23 which are electrically connected to the repeater potentiometer through conductors 24. A set of sliding brush contacts 25, symbolically represented as arrows in the diagram provide a moving connection between the crane and the rails.

The apparatus of the present invention is adapted to transmit the reading of the dial 19 as electrical signals through the pick-up rails 20 to a remote position for presentation on a separate indicator or indicators for utilization by an operator or for the performance of some recording function. To this end, there is provided in the crane a repeater potentiometer 26 which has a shaft 27 connected to the shafts 17 and 18 of the potentiometer 14 and servomotor 16. The potentiometer 26 serves to convert the mechanical position of the scale dial 19 into an appropriate variation of an electrical quantity—in this case, a variation of electrical resistance. The potentiometer comprises a resistance winding having two end terminals connected to the rail conductors 21 and 23 through the conductors 24 and the sliding brush contacts 25. A third terminal of the potentiometer is a variable terminal and is connected to the center pick-up rail 22 through a corresponding conductor 24 and sliding brush contact 25.

An alternate supply 60 may be utilized to supply electrical energy to potentiometer 26 in the crane in a manner to be explained later.

At the remote position, there is provided an indicator potentiometer 28, similar to the repeater potentiometer 26, and having the end terminals thereof connected to the rail conductors 21 and 23. An amplifier 29 has an input circuit serially connected between the central rail conductor 22 and the variable terminal of the potentiometer 28. The output of the amplifier 29 is utilized to feed the input circuit of a servo motor 30 which has its shaft 31 mechanically connected to the shaft 32 of the potentiometer 28 to drive that shaft. An indicator 33, connected to the shafts 31 and 32, provides a weight indicating means similar to that in the crane. Electrical energy is supplied to the repeater system by supply 34. The remote indicating apparatus may, of course, be duplicated at several positions.

Referring now to Fig. 2, there is shown a schematic diagram of the circuit of the apparatus of Fig. 1. The circuit includes, as essential elements thereof, the repeater potentiometer 26, the rail conductors 21, 22 and 23, the indicator potentiometer 28, the amplifier 29 and the servomotor 30. The potentiometer 26 with conductors 35, 36 and 37, rail conductors 21, 22 and 23, and potentiometer 28 with associated conductors 38, 39 and 40 form a Wheatstone bridge circuit of known type. The variable terminals 41 and 42 of potentiometers 26 and 28, respectively, form one set of poles of the bridge circuit, normally termed the galvanometer poles, which are connected to the amplifier 29 through conductors 43, 44 and 39, 22 and 36. The remaining poles of the bridge are connected to the supply 34.

The servomotor 30 has its input circuit connected to the output circuit of the amplifier 29, while the shaft 31 of the motor is connected to the variable terminal of the potentiometer 28 in such a fashion that an output voltage from the amplifier 29 excites the servomotor to drive the variable terminal 42 to the zero-potential or balance position. That is, the servomotor 30 always tends to keep the bridge in a balanced position wherein the position of variable terminal 42 of potentiometer 28 corresponds to the position of the variable terminal 41 of the repeater potentiometer 26. Thus, the indicator 33 may be put into continuous correspondence with the position of the crane indicator 19 which is connected to and determines the position of the variable terminal 41 of the repeater potentiometer 26. The manner of operation of the bridge circuit and of the servomotor and amplifier as a servo system is, of course, well known to those skilled in the art.

The circuit of the invention includes various features in addition to the essential elements described above and which contribute to the practical success of the apparatus. In particular, there is included a resistor 45 in series connection with the supply 34, the resistor being of sufficient magnitude relative to the apparent load presented by the bridge circuit so that the supply 34 functions as a constant current source. Similarly, an ancillary supply at the crane may include a supply 60 and a resistor 46 in series connection across the potentiometer 26. The polarity of the supply 60 is connected in opposition to that of the supply 34 so that, ideally, no circulating current will flow in the rail conductors 21 and 23, and the effect of brush contact resistance at those conductors is eliminated. The use of the second supply also insures operation of the repeater system in the event of failure of one supply. The supplies 34 and 60 are indicated symbolically and may comprise any suitable apparatus, known in the art, for generating properly regulated voltages.

It is to be understood, of course, that the utilization of the second power supply 60 and series resistor 46 in combination with the supply 34 and resistor 45 comprise an important aspect of the practice of the invention insofar as the reduction of brush contact effects is concerned. Further, the use of such a second supply permits the practice of the invention in an alternate embodiment.

Resistors 47, 48, 49, 50, 51, and 52 are provided in order that the bridge arm resistance may be relatively high compared to the resistance of the various interconnecting conductors. Resistor 52 is indicated as a variable resistor and serves as a means whereby the indicator 33 may be adjusted for correspondence with the indicator 19 by varying the zero or balance position of the variable terminal 42 of potentiometer 28. Resistor 53 permits calibration of the span of indicator 33 and practically independently of the control of the zero position by the resistor 52. Resistors 54 and 55 form an alternate bridge circuit whereby, in the event that any of the interconnecting conductors should become broken as by the separation of brushes 25 from the rail conductors, the indicator 33 will automatically return to a zero position, thus preventing an erroneous indication of weight at the remote condition.

The potentiometers referred to herein are of a type known in the electrical arts and include typically an electrical resistance element and a slider which is moved along the element by rotation of a shaft, there being a precise correlation between the resistance at the slider and the position of the slider. The fixed terminals of the resistance element are designated as end terminals while the slider is designated as a variable terminal. The term "end" is to be construed in an electrical rather than a geometric sense.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. An indicating system comprising in combination a plurality of extended conductors, a potentiometer comprising an electrical resistance element having first and second end terminals, a sliding contact comprising a variable terminal and adapted to be moved along said resistance element, the variable terminal being adapted to be connected to a position determining device, electrical connections between said potentiometer and said extended conductors including movable members in contact with the conductors, a source of electrical energy connected across the end terminals of said potentiometer, a relatively high resistance resistor in series connection between said source and said potentiometer, a second similar potentiometer having first and second end terminals, and a variable terminal, the slider of said second variable terminal being adapted to be connected to a position reproducing device, an amplifier, electrical connections between said end terminals of said second potentiometer and the conductors corresponding to the end terminals of the first potentiometer, electrical connections between the input circuit of said amplifier, the conductors connected to the variable terminal of the first potentiometer and the variable terminal of the second potentiometer, an electrical servomotor having an input circuit connected to the output circuit of said amplifier and a shaft connected to the variable terminal of said second potentiometer, a source of electrical energy connected across the end terminals of said second potentiometer, and a high resistance resistor in series connection between said last-named energy source and the said second potentiometer whereby the changes in the position of the variable terminal of the first potentiometer are reproduced substantially independently of the nature of the connections between the potentiometers and the extended conductors.

2. Apparatus for transmitting data from a movable carrier to a fixed position comprising three conductor rails and three movable contactors on the carrier engaged with the rails, a Wheatstone bridge follow-up system including a potentiometer on the carrier connected to the movable cotnactors and a potentiometer and servomotor connected to the rails at the fixed position, a first electrical supply for the follow-up system connected across the potentiometer on the carrier and a second electrical supply for the follow-up system connected across the potentiometer at the fixed position and in opposite polarity to the electrical supply on the carrier.

3. The invention in accordance with claim 2 including a resistor connected in series with the electrical supply on the carrier and a resistor connected in series with the electrical supply at the fixed position for minimizing the effect of contact resistance between the movable contactors and the rails.

4. The invention in accordance with claim 3 and including two resistors connected in series between the three rails at the fixed position for driving the servo motor to a predetermined position in the event of circuit failure at the movable carrier.

References Cited in the file of this patent

UNITED STATES PATENTS

| | | |
|---|---|---|
| 638,893 | Vernon et al. | Dec. 12, 1899 |
| 1,483,235 | Morse | Feb. 12, 1924 |
| 2,022,844 | Christian | Dec. 3, 1935 |
| 2,061,410 | Stablein | Nov. 17, 1936 |
| 2,208,623 | Bond | July 23, 1940 |
| 2,401,115 | Spafford | May 28, 1946 |
| 2,412,263 | Hartig | Dec. 10, 1946 |
| 2,414,161 | Moore | Jan. 14, 1947 |
| 2,434,138 | Adams | Jan. 6, 1948 |
| 2,581,205 | Reilly | Jan. 1, 1952 |
| 2,589,998 | Dougherty et al. | Mar. 18, 1952 |
| 2,613,611 | Simon | Oct. 14, 1952 |

FOREIGN PATENTS

| | | |
|---|---|---|
| 494,813 | Great Britain | Nov. 1, 1938 |